US012397320B2

(12) United States Patent
Herson et al.

(10) Patent No.: US 12,397,320 B2
(45) Date of Patent: Aug. 26, 2025

(54) SMART CONVEYOR BELT SERVICE

(71) Applicant: Verizon Patent and Licensing Inc., Basking Ridge, NJ (US)

(72) Inventors: Andrew W. Herson, Berkeley, CA (US); Maryam Seraj, Santa Clara, CA (US); Shaikh Nazrul Islam, Santa Clara, CA (US); John Sotiriadis, Saratoga, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 778 days.

(21) Appl. No.: 17/732,108

(22) Filed: Apr. 28, 2022

(65) Prior Publication Data

US 2023/0347384 A1 Nov. 2, 2023

(51) Int. Cl.
*B07C 3/08* (2006.01)
*B07C 3/00* (2006.01)
*B07C 3/18* (2006.01)

(52) U.S. Cl.
CPC ................ *B07C 3/006* (2013.01); *B07C 3/08* (2013.01); *B07C 3/18* (2013.01); *B07C 2301/0025* (2013.01); *B07C 2301/005* (2013.01)

(58) Field of Classification Search
CPC .............. B07C 3/006; B07C 3/08; B07C 3/18
See application file for complete search history.

(56) References Cited

U.S. PATENT DOCUMENTS

| | | | | |
|---|---|---|---|---|
| 9,192,965 B2 * | 11/2015 | Serjeantson | B07C 3/06 |
| 10,179,699 B1 * | 1/2019 | Roper | G06Q 10/08 |
| 11,224,898 B2 * | 1/2022 | Fumagalli | B07C 5/36 |
| 11,301,654 B2 * | 4/2022 | Wagner | B65G 47/91 |
| 11,416,695 B2 * | 8/2022 | Wagner | G06K 7/10693 |
| 11,499,810 B2 * | 11/2022 | Ketterer | H04N 23/61 |
| 11,939,162 B2 * | 3/2024 | Douglas | B65G 1/1375 |
| 2002/0092801 A1 * | 7/2002 | Dominguez | B07C 5/3412 209/583 |
| 2014/0291112 A1 * | 10/2014 | Lyon | B65G 1/1378 198/369.1 |
| 2022/0168780 A1 * | 6/2022 | Yang | B07C 3/08 |
| 2022/0289416 A1 * | 9/2022 | Finnsson | B65B 43/60 |

FOREIGN PATENT DOCUMENTS

JP 2004242693 A * 9/2004

* cited by examiner

*Primary Examiner* — Patrick H Mackey

(57) ABSTRACT

A smart conveyor belt web service is provided. A network device generates recipes for multiple orders. Each recipe provides sorting instructions for a conveyor system. The network device transfers an identifier for a first recipe to a queue of active recipes and sends the first recipe to a server device for the conveyor system. The network device receives a recipe-complete status message indicating completion of the first recipe. The network device deletes the indicator for the first recipe from the queue based on receiving the recipe-complete status message and transfers a second recipe to the queue of active recipes to initiate processing of another order.

20 Claims, 8 Drawing Sheets

410

FIG. 4A

```
curl -X POST -d '{
    "reference": "abc-123456789",
    "description": "recipe description",
    "items": [
        {
            "id": "123456",
            "quantity": 1,
            "specification": "ephone 12"
        },
        {
            "id": "5678",
            "quantity": 2,
            "specification": "ephone 12 case"
        },
    ]
}'
```

420

FIG. 4B

```
{
  "bins": [
    {
      "sortingBin": 1,
      "reference": "abc-123456789",
      "description": "recipe description",
        "items": [
        {
          "id": "123456",
          "quantity": 1,
          "specification": "ephone 12",
          "quantity-scanned": 0
        },
        {
          "id": "5678",
          "quantity": 1,
          "specification": "ephone 12 case",
          "quantity-scanned": 1
        }
      ]
    }
  ]
}
```

430

```
{
    "bins": [
        {
            "sortingBin": 2,
            "reference": "xyz-0987654321",
            "description": "recipe description",
            "items": [
                {
                    "id": "IMEI1234",
                    "quantity": 1,
                    "specification": "<barcode-1> | <barcode-2> | … | <barcode-n>"
                },
                {
                    "id": "2468",
                    "quantity": 3,
                    "specification": "<barcode-1> | <barcode-2> | … | <barcode-n>"
                }
            ]
        }
    ]
}
```

FIG. 4C

SMART CONVEYOR BELT SERVICE

BACKGROUND

Many merchants and vendors use shipping services to provide products to customers. Accurately packing boxes for customer shipments is an expensive process. Packing boxes for different combinations of products typically requires substantial human resources and can be prone to error. Some packing processes may be automated using a conveyor system. However, configuring a conveyor system to accommodate different types of customer orders remains a challenge.

BRIEF DESCRIPTION OF THE DRAWINGS

FIGS. 4A-4C are examples of request and response formats that may be used in the smart conveyor belt web service;

DETAILED DESCRIPTION OF EXAMPLE EMBODIMENTS

Figure 1:
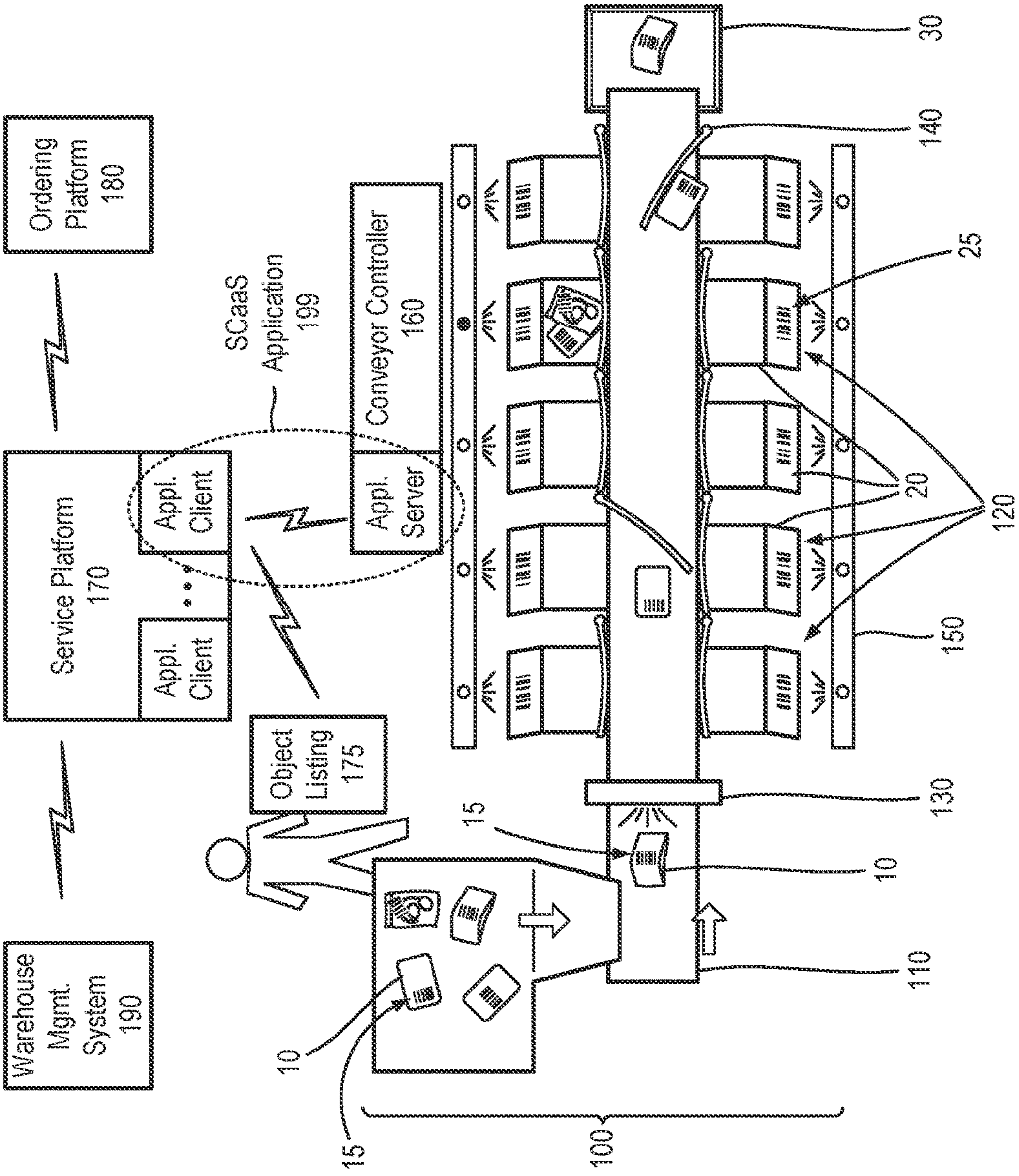
FIG. 1 is a diagram illustrating concepts described herein.

The following detailed description refers to the accompanying drawings. The same reference numbers in different drawings may identify the same or similar elements.

Systems and methods described herein provide a service to allow for the dynamic sorting of items into respective bins around a conveyor belt system. Each bin represents and is used to fulfill an individual order, referred to herein as a "recipe." Each recipe includes a complete list of all items belonging to an order. Recipes are queued and posted to the conveyor belt system as bins become available. Filled bins with completed orders are signaled for removal and replaced with empty bins that can accommodate new orders with dynamic assignment of new recipes. Thus, systems and methods described herein relate to continuous, dynamic sorting system for assembling heterogeneous orders.

As described further herein, a smart conveyor belt management system includes a smart conveyor belt application (e.g., a service such as a web service, etc.) that uses an application server and an application client. Although some communications are described herein in the context of hypertext transfer protocol (HTTP) protocol, different protocols, such as HTTP Secure (HTTPS), may be used in other implementations. An HTTP server resides with the conveyor belt, and an HTTP client remains on a separate server for requesting and using the resources provided by the HTTP server. A REST API architecture may be leveraged in the smart conveyor belt service to make the interaction between the HTTP client and the HTTP server simple and stateless and may provide the interface between the two more uniform. Mechanical control of the conveyor belt and hardware components associated with the conveyor belt are managed by a conveyor belt control system, which may be associated with a vendor or customer that subscribes to the smart conveyor belt service. The management of the resources, such as recipes and alarms, is performed by the service application.

According to an implementation, the application client resides on a service provider's network edge (e.g., a Radio Access Network (RAN) edge). The application client may receive multiple orders (e.g., customer orders), with each of the orders indicating one or more physical objects to be shipped to a customer. The application client may generate a separate recipe for each of the orders, with each of the recipes providing sorting instructions for a conveyor system. The application client may transfer an identifier (e.g., a unique order number or a different unique identifier) for a first recipe of the recipes to a queue of active recipes. The queue is configured to hold a number of entries up to the maximum capacity of the conveyor system (e.g., the number of sorting stations). The application client may send the first recipe to an application server for the conveyor system and separately provide an object list for the first recipe. The object list identifies physical objects to be placed on the conveyor system (e.g., by warehouse staff and/or an automated picking system). The application client may receive a "recipe-complete" status message indicating completion of the recipe by the conveyor system, and, in response, may delete the first recipe from the queue based on the message.

Assuming a full queue, deletion of the first recipe may provide space in the queue of active recipes for another (e.g., second) recipe. In response to the deletion, the application client may transfer a second recipe to the queue, wherein the second recipe indicates one or more different physical objects than the first recipe. The application client may send the second recipe to the application server, and separately send an object list that can be used to supply the physical objects for the second recipe.

FIG. 1 illustrates concepts described herein. As shown in FIG. 1, conveyor system 100 may be managed by a service platform 170 to place objects 10 into boxes 20. Each object 10 (e.g., a product to be shipped to a customer) may be labeled with a unique identifier, such as a barcode, QR code, or another machine-readable identifier (referred to herein as an "object bar code 15"). Each box 20 (e.g., an individual shipping container) may also be labeled with a unique identifier (referred to herein as an "box bar code 25").

Conveyor system 100 may include a conveyor belt 110, multiple sorting stations 120, a barcode reader 130, diverters 140, status monitors 150, and a conveyor controller 160. Objects 10 are placed on a feed area of conveyor belt 110. Each of the sorting stations 120 may hold a box 20 for receiving objects in accordance with a specific recipe (e.g., corresponding to a customer order). Conveyor belt 110 moves objects 10 from the feed area past barcode reader 130 and multiple stations 120 toward a reject bin 30. Barcode reader 130 may identify an object bar code 15 as the convey belt 110 carries an object 10 past barcode reader 130. When a box 20 is placed within a sorting station 120, diverters 140 can be selectively positioned to divert objects 10 from conveyor belt 110 into a desired box 20.

Status monitors 150 provide sensors and visual indicators to inform of conditions for each sorting station 120. Status monitors 150 may include one or more sensors (e.g., pressure/weight sensors) and barcode readers that can identify when a box 20 is placed in a sorting station 120 and the barcode 25 of the respective box 20. Status monitors 150 may provide information to conveyor controller 160. The information may be used to assign recipes, track sorting progress, and identify errors. For example, for each sorting station 120, status monitor 150 may indicate that a box is being filled in accordance with a recipe is in progress, that filling of a box according to a recipe is complete, that a sorting station is available, or an alarm/error condition has occurred. According to an implementation, status monitors 150 may also include indicators (e.g., colored lights) to provide a visual status for each sorting station 120. For example, a green light may indicate a filling (of a box in accordance with a recipe) is complete, a yellow light may indicate a filling is in progress, a red light may indicate an alarm condition, and a no light may indicate the station is unassigned (e.g., no activity).

Conveyor controller 160 may direct the mechanical operation of conveyor system 100 based on instructions from service platform 170. Conveyor controller 160 may receive signals from barcode reader 130 and status monitors 150 to identify objects 10/boxes 20 and to direct objects 10 into boxes 20 by controlling diverters 140 when objects move on conveyor belt 110.

Service platform 170 may include one or more computer or network devices to provide a smart conveyor belt web service. Although a single conveyor system 100 is shown in FIG. 1, service platform 170 may be located in a service provider's network and may be configured to provide services to multiple conveyor belt systems 100. Service platform 170 may receive customer orders from ordering platform 180. Service platform 170 may convert the customer orders to recipes that include, for example, specific item descriptions and barcode numbers/SKUs (stock keeping units). The recipes may also specify quantities (i.e., number of objects). Service platform 170 may provide the recipes to a worker or workstation as object listing 175. Object listing 175 may include a physical or digital list to indicate to a worker what objects 10 need to be pulled from warehouse shelves and placed onto conveyor belt 110 for sorting. Service platform 170 may also provide the recipes to conveyor controller 160 to implement dynamic sorting.

As described further herein, service platform 170 may use Smart Conveyor as a Service (SCaaS) application 199, including an application client and an application server, to manage continuous, dynamic sorting of orders. Each application server may be associated with, for example, a single conveyor system 100 (e.g., integrated with conveyor controller 160) or multiple conveyor systems 100 within a local area network (LAN). Service platform 170 may instantiate multiple application clients to be serviced by different application servers (e.g., associated with different conveyor systems 100 and/or shipping customers).

Ordering platform 180 may include a network device or computing device to obtain orders that require packaging and shipping. Ordering platform 180 may, for example, be part of a web-based platform for an online store or marketplace that receives order for physical products that must be shipped to buyers. Orders may include, for example, a combination of heterogeneous objects 10 that may be different for different orders.

Warehouse management system 190 may include devices (e.g., networked computers) to track inventory, locate objects, and/or provide objects for sorting on conveyor systems 100. According to an implementation, warehouse management system 190 may communicate with service platform 170 to track outgoing inventory (e.g., objects 20). According to another implementation, warehouse management system 190 may include automated systems to provide objects to conveyor system 100.

In operation, a single sorting station 120/box 20 may be assigned to each recipe by conveyor controller 160. Based on signals from barcode reader 130, conveyer controller 160 may identify objects 10 placed on conveyor belt 110 and direct the objects 10 for the recipe into a single box 20. For example, conveyor controller 160 may assign a box 20 to a recipe when a first object 10 for the recipe is scanned by barcode reader 130. A barcode 25 for the assigned box 20 may be associated with the recipe/order. Once all objects 10 for a recipe are sorted into the corresponding box 20, the sorting process for that recipe is complete, at which point that box 20 can be identified as filled or complete and replaced in sorting station 120 with a new empty box 20 by a worker. With a new empty box 20 in sorting station 120, the scanning and sorting of objects 10 for the next new recipe can commence to maintain a dynamic sorting operation.

Figure 2:
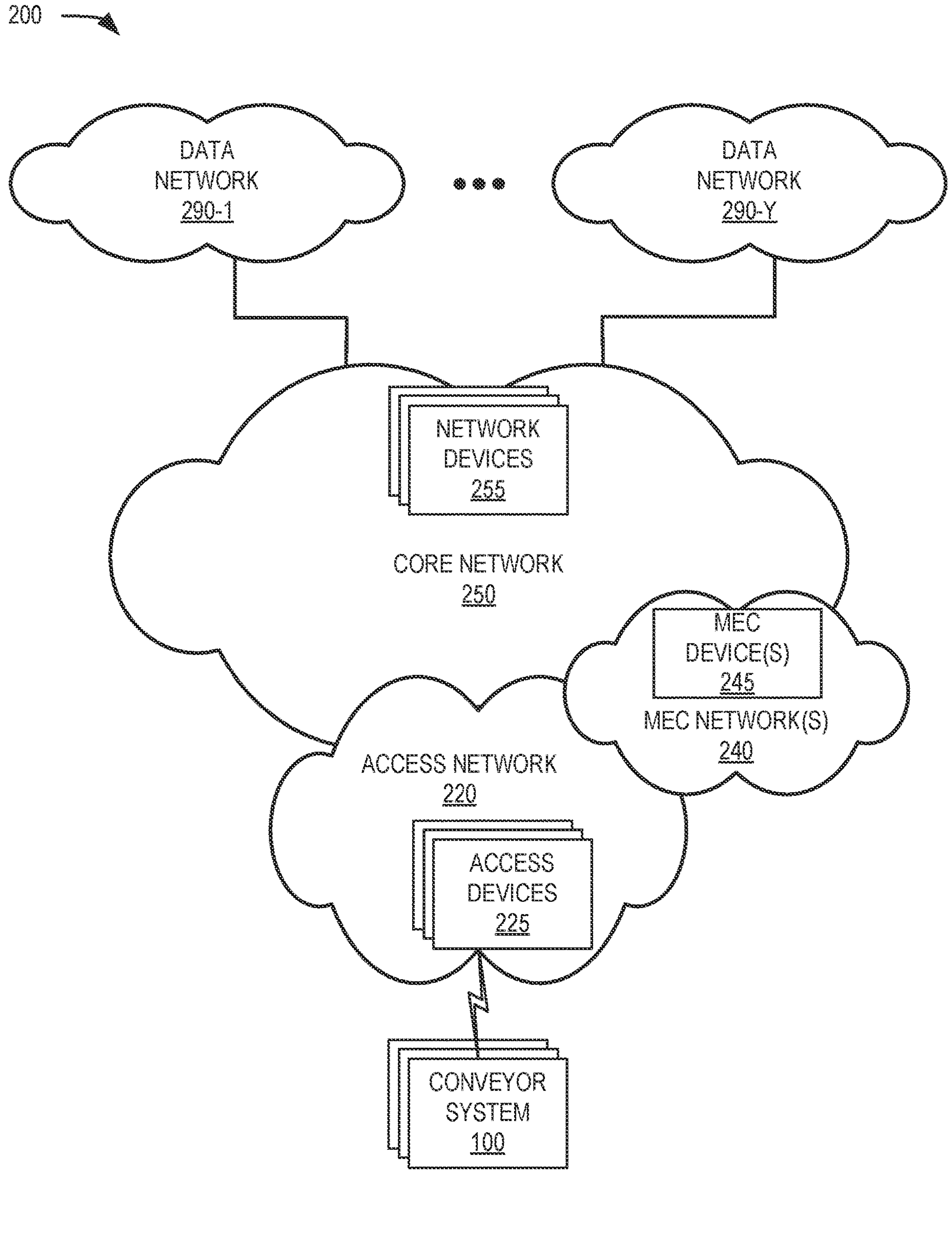
FIG. 2 is a diagram illustrating an example network environment in which a smart conveyor belt web service described herein may be implemented.

FIG. 2 is a diagram of an example network environment 200 in which a smart conveyor belt web service may be implemented. As shown in FIG. 2, environment 200 may include conveyor controller 160, a radio access network (RAN) 220 that includes access devices 225, multi-access edge computing (MEC) networks 240 that include MEC devices 245, a core network 250 that includes network devices 255, and data networks (DNs) 290-1 to 290-Y (referred to herein collectively as "DNs 290" and individually as "DN 290").

Conveyor controller 160 may include a computing device or a communication device. Conveyor controller 160 may include, for example, a device with cellular wireless communication functionality. For example, conveyor controller 160 may be equipped with a cellular communications module (e.g., a data card) to enable conveyor controller 160 to communicate with access network 220. In another implementation, conveyor controller 160 may include another communication module to enable indirect access to access network 220, such as a wired or wireless interface to a hotspot device, a fixed wireless access device, and/or any other type of computer device with wireless communication capabilities. Conveyor controller 160 may be associated with a subscriber/account for using services of access network 220, MEC network 240, and/or core network 250. Conveyor controller 160 may also include a processor and software (e.g., a SCaaS application server), as described further herein.

Access network 220 may enable conveyor controller 160 to connect to core network 250 and/or MEC network 240 via access devices 225 using cellular wireless signals. Access device 225 may include a 5G New Radio (NR) base station (e.g., a gNodeB) and/or a Fourth Generation (4G) Long Term Evolution (LTE) base station (e.g., an eNodeB). Each access device 225 may include devices and/or components configured to enable cellular wireless communication with conveyor controller 160. For example, access device 225 may include a radio frequency (RF) transceiver configured to communicate with UE devices using a 5G NR air interface, a 4G LTE air interface, and/or using another type of cellular air interface. Access device 225 may enable communication with core network 250 to enable core network 250 to authenticate and monitor network activity of conveyor controller 160. According to one implementation, access network 220 may include a non-standalone (NSA) network to support dual coverage using 4G and 5G networks. In another implementation, access network 220 may include a 5G standalone (SA) architecture.

Each MEC network 240 may be associated with one or more access devices 225 and may provide MEC services for conveyor controllers 160 attached to the access devices 225. MEC network 240 may be in proximity to the access devices 225 from a geographic and network topology perspective, thus enabling low latency communication with conveyor controller 160 and/or access devices 225. As an example, MEC network 240 may be located on a same site as one of the access devices 225. As another example, MEC network 240 may be geographically closer to the access devices 225 and reachable via fewer network hops and/or fewer switches than other access devices 225 and/or data networks 290. MEC network 240 may include one or more MEC devices 245. MEC devices 245 may provide MEC services to conveyor controller 160, such as, for example, an SCaaS client application for service platform 170.

Core network 250 may be managed by a provider of cellular wireless communication services and may manage communication sessions of subscribers connecting to core network 250 via access network 220. Core network 250 may include one or multiple networks of different types and technologies. For example, core network 250 may be implemented to include a next generation core (NGC) network for a 5G network, an Evolved Packet Core (EPC) of an LTE network, an LTE-A network, an LTE-A Pro network, another type of 4G core network, and/or a legacy core network.

Core network 250 may include various network devices 255. Depending on the implementation, network devices 255 may include 5G core network components (e.g., a User Plane Function (UPF), an Application Function (AF), an Access and Mobility Management Function (AMF), a Session Management Function (SMF), a Unified Data Management (UDM) function, a Network Slice Selection Function (NSSF), a Policy Control Function (PCF), a Unified Data Repository (UDR) etc.), 4G core network components (e.g., a Serving Gateway (SGW), a Packet Data Network Gateway (PGW), a Mobility Management Entity (MME), a Home Subscriber Server (HSS), etc.), or another type of core network components (e.g., future 6G network components). In other implementation, network devices 255 may include combined 4G and 5G functionality, such as a session management function with PDN gateway-control plane (SMF+PGW−C) and a user plane function with PDN gateway-user plane (UPF+PGW−U).

Network device 255 may include a physical function node or a virtual network function (VNF). Thus, the components of core network 250 may be implemented as dedicated hardware components and/or as VNFs implemented on top of a commonly shared physical infrastructure using Software Defined Networking (SDN). The shared physical infrastructure may be implemented using one or more devices 700 described below with reference to FIG. 7 in a cloud computing center associated with core network 250. Additionally, or alternatively, some, or all, of the shared physical infrastructure may be implemented using one or more devices 700 included in MEC device 245.

DNs 290 may each include a data network, such as a packet data network. A particular DN 290 may be associated with an Access Point Name (APN) and UE device 210 may request a connection to the particular packet data network 290 using the APN. DN 290 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 2 shows example components of environment 200, in other implementations, environment 200 may include fewer components, different components, differently arranged components, or additional components than depicted in FIG. 2. Additionally, or alternatively, one or more components of environment 200 may perform functions described as being performed by one or more other components of environment 200.

Figure 3:
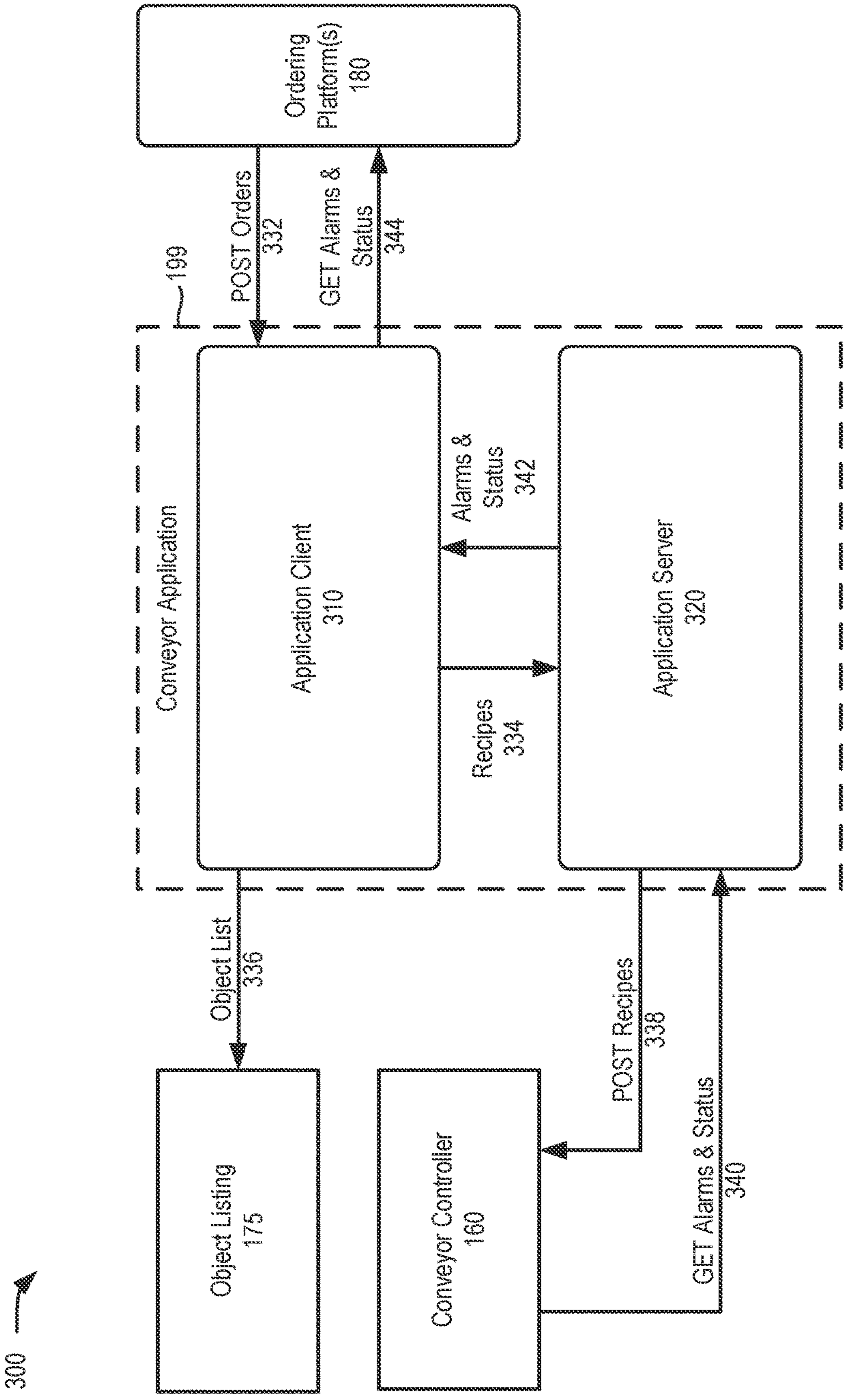
FIG. 3 is a diagram illustrating communications among example components of the smart conveyor belt web service.

FIG. 3 is a diagram illustrating functions and communications of SCaaS application 199 in a portion 300 of network 200. As shown in the example of FIG. 3, SCaaS application 199 may be implemented as an application client 310 (e.g., an HTTP client) and an application server 320 (e.g., an HTTP server). Application server 320 may be included on location with conveyor system 100 (e.g., executed on or in communication with conveyor controller 160). Application client 310 may be executed within a service provider network, such as MEC network 240, core network 250, or data network 290. A REST API architecture may be leveraged to make the interaction between SCaaS application 199 and controller 160 simple and stateless, and the interface between the two more uniform.

Conveyor controller 160 may manage the mechanical control of conveyor system 100 and the associated hardware components. Management of the software resources, such as recipes and alarms described herein remain with SCaaS application 199. Controller 160 may receive and process recipes from server 320. Controller 160 may perform scans of objects 10 (e.g., barcodes 15) and boxes (e.g., barcodes 25). Controller 160 may direct sorting of objects 10 from conveyor belt 110 into boxes 20 based on the scans and the recipes. Controller 160 may report alarms and status reports to server 320.

Ordering platform 180 may obtain orders that require packaging and shipping. Orders may include, for example, a list of objects 10 (e.g., a collection of identifiers for the objects 10). Ordering platform 180 may provide orders to SCaaS application 199 (e.g., application client 310) affiliated with ordering platform 180.

Application client 310 may receive orders posted from ordering platform(s) 180 and create a recipe for each order. A recipe may include a list of individual components for an order. In some implementations, the recipe may also include a preferred size for box 20 (e.g., a box with certain dimensions for holding the collection of items in the recipe). That is, application client 310 may calculate required box dimensions based on the recipe and select a smallest box size (e.g., of standard box sizes available to conveyor system 100) that meets the required box dimensions. Application client 310 may queue recipes for submission to server 320/controller 160. Application client 310 may also respond to alarms and/or status reports received from server 320. According to an implementation, application client 310 may be instantiated in a MEC device 245 (e.g., with geographic proximity to application server 320 and/or an access device 225 servicing application server 320). Application client 310 is described further in connection with FIG. 4.

Application server 320 may receive recipes from application client 310 and may post the queued recipes to controller 160. Server 320 may receive alarms and status reports from controller 160, queue the alarms and/or status reports, and forward the alarms and status reports to application client 310. According to an implementation, server 320 may be included with or physically connected to controller 160. According to an implementation, server 320 may issue API calls to controller 160 for the smart conveyor belt web service. According to an implementation, the APIs may include REST APIs for application 199 to provide instructions to controller 160 to: post a new recipe, get a list of active recipes, get a list of unmatched items, get a list of completed recipes, delete a specific (e.g., active or completed) recipe, post a delete requests to delete all active and completed recipes, get a list of all active alarms, delete a specific alarm, post a delete all (e.g., outstanding and active) alarms, and get a system health status.

In operation, ordering platform 180 may obtain orders that require packing and shipping of objects 10. Orders may include, for example, same or different set of objects 10. Ordering system may send orders 332 to application 199. For example, ordering platform 180 may establish a communication session with application client 310 and provide an HTTP Post message with an order to application client 310. Application client 310 may receive orders 332 and may generate a recipe 334 for each order. Each recipe 334 may be placed in a queue that is managed by application client 310. Application client 310 may release recipes 334 for fulfilment in accordance with the number of sorting stations 120 available in conveyor system 100. For example, if conveyor belt system 110 has ten stations 120, each with a box 20, application client 310 may provide up to 10 active recipes to server 320 and enqueue any other recipes that exceed the current capacity of the conveyor system 100.

Along with sending an active recipe to server 320, application client 310 may also send an object list 336 to object listing 175. Object list 336 may be used (e.g., by warehouse personnel or automated systems) to retrieve objects 10 from warehouse shelves and place the retrieved objects on conveyor belt 110 for sorting. According to an implementation, object list 336 may include a copy of recipe 334. In another implementation, server 320 may extract an object list 336 from a recipe 334 for presentation to object listing 175.

Application server 320 may receive recipes 334 and may post recipes 338 to controller 160. FIG. 4A illustrates an example of a post recipe message 410 that may be sent from application server 320 to controller 160. As illustrated in FIG. 4A, each post recipe message 410 may include a unique "reference" ID (e.g., corresponding to an order number) and a list of objects. Each object listed in a recipe may also have a unique ID (e.g., corresponding to an SKU), a quantity, and a specification/description. As part of an exchange for posting recipes 338, controller 160 may provide one of several possible HTTP responses, including for example:

- 201 (CREATE)—Standard response for a recipe being successfully posted.
- 400 (BAD REQUEST)—The request cannot be processed because of bad request syntax, excessive size, or another client error.
- 404 (NOT FOUND)—The resource could not be found at this time. It is possible it was deleted, or does not exist yet.
- 500 (INTERNAL SERVER ERROR)—A generic answer for an unexpected failure if there is no more specific information available.

Assuming a success recipe posting 338, controller 160 may sort objects 10 (e.g., objects placed onto conveyor belt 110) into boxes 20, according to instructions post recipe message 410.

As indicated by reference 340, application server 320 may request alarms and recipe status from controller 160. For example, application server 320 may provide HTTP GET messages (e.g., at regular polling intervals) to request an active recipe status, a listing of all active recipes with controller 160, alarm reports, etc. FIG. 4B illustrates an example of a status message 420 that may be sent from controller 160 to application server 320 in response to a request to get a list of active recipes. As illustrated in FIG. 4B, status message 420 may include a list of active recipes with their "reference" IDs and list of items with their unique IDs or an empty list. In FIG. 4B, the active list of recipes includes a single recipe for simplicity. FIG. 4C illustrates an example of a status message 430 that may be sent from controller 160 to application server 320 in response to a request to get a list of completed recipes. As illustrated in FIG. 4C, status message 430 may include a list of active recipes with their "reference" IDs and list of items with their unique IDs or an empty list. In the illustration of FIG. 4C, the active list of recipes includes a single recipe for simplicity. The "specification" field in message 430 may be used to list all of barcodes (e.g., object barcodes 25) that were detected while scanning an object 20. As described further herein, the completed recipes indicated in status message 430 may be explicitly requested to be deleted from the active queue by the application client 310.

Server 320 may provide alarm and recipe status information 342 to application client 310. As described further below, application client 310 may apply the status/alarm information to manage queues and direct completion of recipes/orders by conveyor system 100. Application client 310 may also receive requests 344 from ordering platform 180 and provide status reports and/or alarm status to ordering platform 180, based on the alarm and recipe status information 342.

Communications shown in FIG. 3 provide simplified illustrations of communications in network portion 300 and are not intended to reflect every signal or communication exchanged between devices/functions. For example, in other implementations a subscription-notification model may be used instead of a request-response model.

Figure 5:
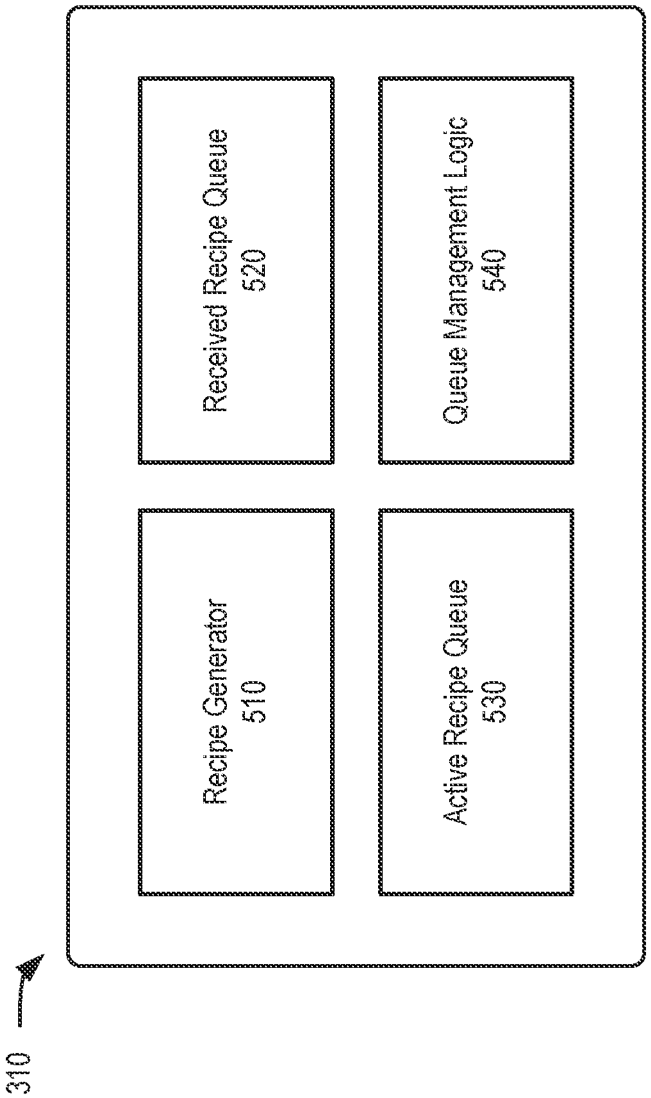
FIG. 5 is a diagram illustrating example logical components of a Smart Conveyor as a Service (SCaaS) application client.

FIG. 5 is a block diagram illustrating logical components of application client 310 to implement the smart conveyor belt web service. As shown in FIG. 5, application client 310 may include a recipe generator 510, a received recipe queue 520, an active recipe queue 530, and queue management logic 540. The components of FIG. 5 may be implemented, for example, by processor (e.g., processor 710 described in connection with FIG. 7) in conjunction with memory (e.g., memory 715 of FIG. 7).

Recipe generator 510 may receive orders (e.g., from order platform 180) and dynamically generate individual recipes for each order. Customer orders may include a unique order number (e.g., an alphanumeric code) and identifiers for multiple objects, with one or more quantity per object. According to an implementation, order 510 may include all the information required to form a recipe, and recipe generator 510 may extract and reformat information in the order into a format useable by conveyor system 100. According to another implementation, recipe generator 510 may communicate with an inventory system (e.g., warehouse management system 190) to collect additional information to generate a recipe. Each object may have a corresponding barcode that is recorded in a warehouse inventory system and used for labeling the packaging for the object. Recipe generator 510 may convert an order into a recipe format, such as:

<ORDER #>
<object_1-description>:<barcode>:<quantity>
<object_2-description>:<barcode>:<quantity>

As a non-limiting example, an order with a designated order number "123xyz" could include a smart phone, a smartphone case, ear buds, and two screen protectors. Recipe generator 510 may convert this order into a recipe, such as:

<ORDER 123xyz>
<Apple_12s_128 GB>:<15489653-1>:<1>
<Kensington_12s_case_red>:<6586974>:<1>
<Pods_2.0>:<55261734-1>:<1>
<Blipo_Screen_12s>:<55261734-1>:<2>

In other implementations, the recipe may include additional or different information. For example, the recipe may additionally include warehouse location (e.g., an aisle and shelf identifier, etc.) for each object. In still another implementation, recipe generator 510 may identify a box/container for a corresponding order. For example, assuming an inventory system can supply sizes/dimensions for each object, recipe generator 510 may be configured to select a size, from multiple box sizes, that is optimal for the group of objects for the corresponding recipe.

Received recipe queue 520 may include a dynamic list of recipes (e.g., pending recipes) output by recipe generator 510. The size of received recipe queue 520 may be larger than active recipe queue 530, as received recipe queue 520 is not limited by the configuration of conveyor system 100. That is, received recipe queue 520 may include, for example, a place holder (e.g., order number) for each recipe that has not yet been assigned to active recipe queue 530 to be processed by conveyor controller 160.

Active recipe queue 530 may include a list of recipes that have been provided to conveyor controller 160 for processing. The number of entries for active recipe queue 530 would be limited to the number of sorting stations 120 in conveyor system 100. The number of entries for active recipe queue 530 may be further limited if one or more sorting stations 120 do not currently have a box 20 or are otherwise indicated to be inoperable.

Queue management logic 540 may include logic to coordinate recipes to be processed by conveyor system 100. After recipes are placed in received recipe queue 520, queue management logic 540 may monitor active recipe queue 530 for availability (e.g., monitor for an empty slot or entry). Assuming active recipe queue 530 is not full, queue management logic 540 may select the oldest recipe from received recipe queue 520, send the selected recipe to server 320, send a copy of the selected recipe (e.g., an order list) to object listing 175, and transfer the selected recipe from received recipe queue 520 to active recipe queue 530.

Queue management logic 540 may receive status reports from conveyor controller 160 (e.g., via server 320). Status reports (e.g., corresponding to alarms and status 340) may include a "bin assigned" message, a "recipe complete" message, and a "bin available" message. The "bin assigned" message may be provided to queue management logic 540 when conveyor system 100 assigns a first object in a recipe to a box 20/sorting station 120. The "bin assigned" message may include a sorting station identifier and/or a corresponding box barcode 25 for the box in that sorting station. A "recipe complete" message may be provided to queue management logic 540 when conveyor system 100 detects that all objects 10 for a recipe have been sorted into a box 20 and the box 20 has been removed from the corresponding sorting station 120. Upon receiving a "recipe complete" status, queue management logic 540 may delete the recipe placeholder and corresponding queue slot from the active recipe queue 530. The "bin available" message may be provided to queue management logic 540 when conveyor system 100 detects that a new box 20 is placed in a sorting station 120 (e.g., upon removing a completed recipe). The "bin available" message may indicate to queue management logic 540 that a queue slot may be made available in active recipe queue 530.

Although FIG. 5 shows exemplary logical components of application client 310, in other implementations, application client 310 may include fewer components, different components, or additional components than depicted in FIG. 5. Additionally, or alternatively, one or more components of application client 310 may be included in another network element. For example, active recipe queue 530 may be stored in server 320 in another implementation.

Figure 6:
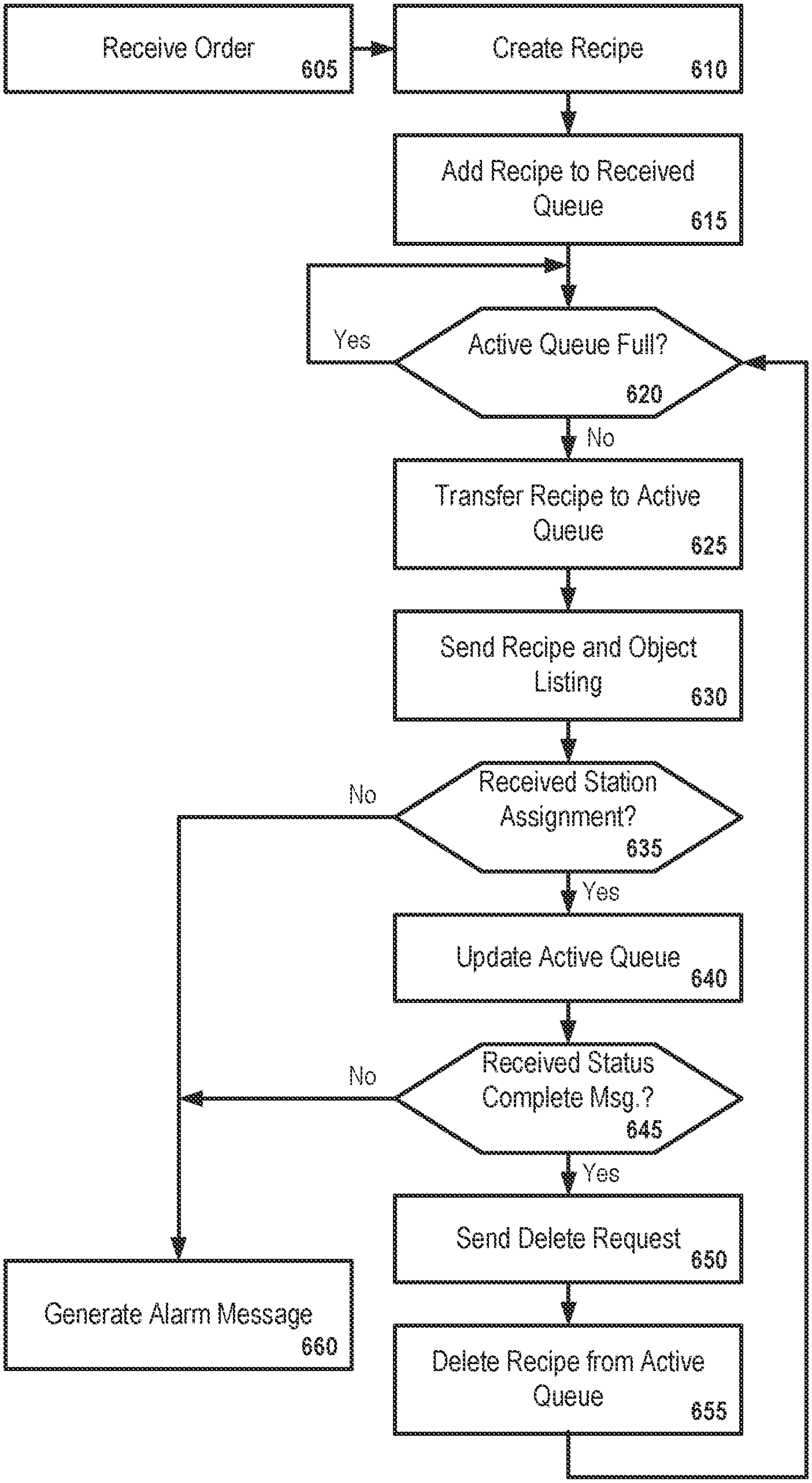
FIG. 6 is a flow diagram illustrating an example process for providing a smart conveyor belt web service, according to an implementation described herein.

FIG. 6 illustrates a logical flow of SCaaS application 199, according to an implementation. Application client 310 may receive an order (block 605), create a recipe (block 610), add the recipe to a receive queue (block 615), and determine if an active recipe queue is full (block 620). For example, recipe generator 510 may receive an order from order platform 180 and dynamically generate an individual recipe. Recipe generator 510 may add a place holder for the recipe to received recipe queue 520. The number of recipes in active recipe queue 530 may be limited to the number of functional sorting stations 120 with boxes 20 in conveyor system 100. Queue management logic 540 may monitor active recipe queue 530 to determine if recipes from received recipe queue 520 can be transferred to active recipe queue 530.

If the active recipe queue is not full (block 620—No), application client 310 may transfer a recipe to the active queue (block 625), send the recipe and object listing (block 630). For example, queue management logic 540 may identity one or more open slots in active recipe queue 530. Queue management logic 540 may transfer the selected recipe from received recipe queue 520 to active recipe queue 530. Queue management logic 540 may select/de-queue the oldest recipe from received recipe queue 520 and send the selected recipe to server 320. Queue management logic 540 may also send a copy of the selected recipe (e.g., object list 336) to object listing 175. In another implementation, object list 336 may be extracted from a recipe 334 by server 320 for presentation as object listing 175.

Application client 310 may monitor status reports for a station assignment (block 635). If a sorting station assignment is received (block 635—Yes), the active queue may be updated (block 640). For example, application client 310 may receive a status report from controller 160 (e.g., via server 320) to indicate that a first object 10 for a recipe has been assigned to a specific sorting station 120 and box 20. The status report may enable application client 310 to associate an order number with a box number for the recipe. Queue management logic 540 may associate in active queue 530 the customer order number with the identifier 25 for box 20.

Application client 310 may monitor status reports for a completion message (block 645). If a recipe complete message is received (block 645—Yes), a delete notification may be provided (block 650), and the active queue may be updated (block 655). For example, application client 310 may receive a status report from controller 160 (e.g., via server 320) to indicate that conveyor system 100 has completed the recipe. According to an implementation, a completed recipe status message may be provided when all objects for the recipe are sorted to a box 20 and the box 20 is removed from sorting station 120. Once a completed recipe status is received by application client 310, application client 310 can then send a DELETE request to server 320/controller 160 for the completed recipe. Additionally, application client 310 may delete the recipe from active recipe queue 530. According to another implementation, application client 310 may also send a record to another entity, such as warehouse management system 190, for further tracking of the order (e.g., via the associated box identifier). According to another implementation, SCaaS application 199 may also send to a warehouse management system 190 an inventory update message based on the completed recipe status. The inventory update message may include, for example, object barcodes and other data from status message 430.

After deleting the recipe from the active queue 530, application client 310 may return to block 620 to add another recipe to the active queue, if necessary. For example, application client 310 may send to server 320 a POST request for a new recipe, if another recipe is available in received queue 520 to be processed.

If a sorting station assignment is not received (block 635—NO), or if a recipe complete message is not received (block 645—No), application client 310 may generate an alarm message (block 660). For example, if application client 310 does not receive a status message with a sorting station assignment for a recipe within a predetermined interval (e.g., three minutes, five minutes, ten minutes, etc.), application client 310 may issue an alarm which may include issuing a notification message to an operator and/or triggering an LED indicator on conveyor system.

Figure 7:
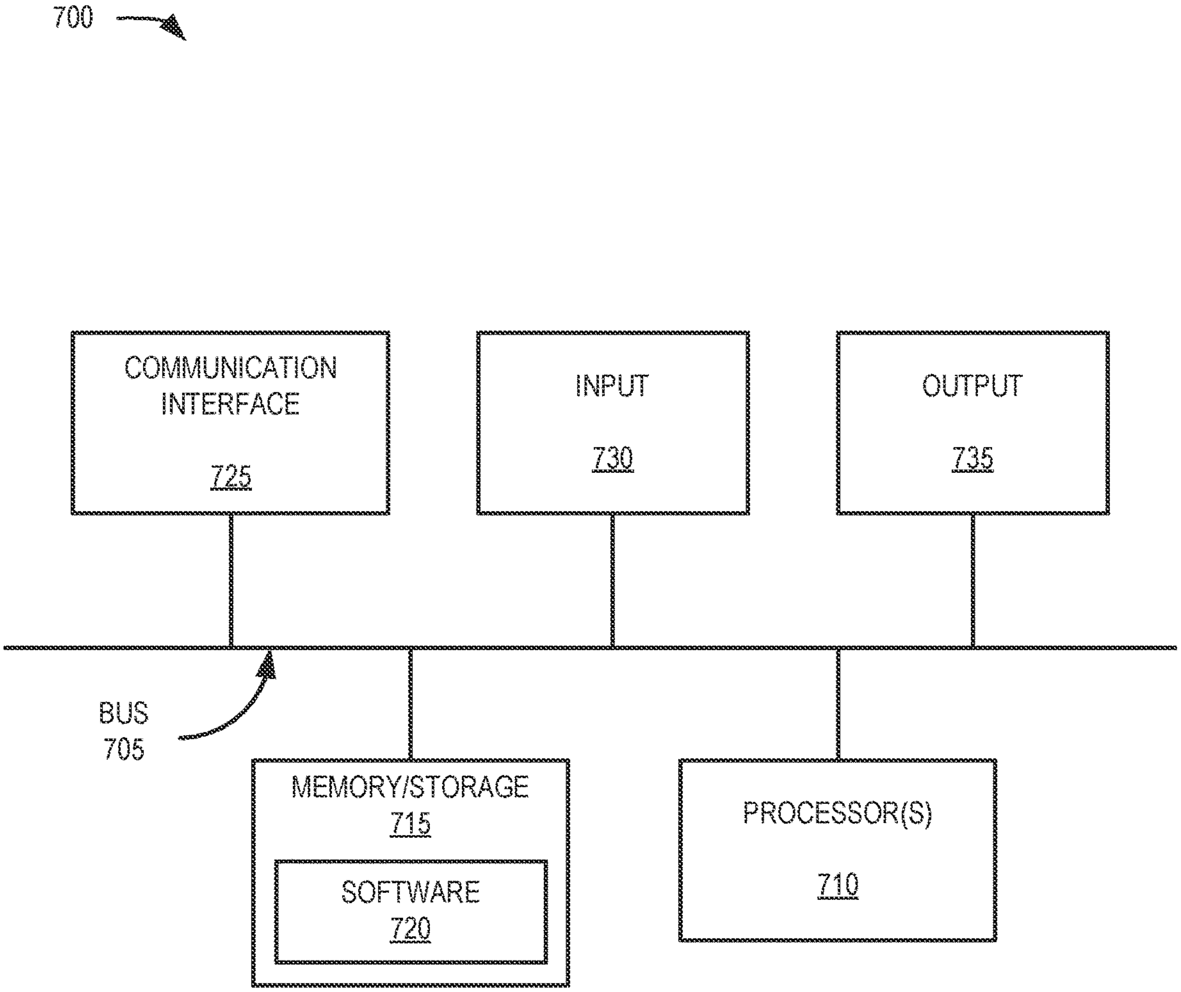
FIG. 7 is a diagram illustrating example components of a device that may correspond to one or more of the devices described herein.

FIG. 7 is a diagram illustrating example components of a device 700 that may be included in one or more of the devices described herein. For example, device 700 may correspond to conveyor controller 160, service platform 170, ordering platform 180, warehouse management system 190, and/or other types of devices, as described herein. As illustrated in FIG. 7, device 700 includes a bus 705, a processor 710, a memory/storage 715 that stores software 720, a communication interface 725, an input 730, and an output 735. According to other embodiments, device 700 may include fewer components, additional components, different components, and/or a different arrangement of components than those illustrated in FIG. 7 and described herein.

Bus 705 includes a path that permits communication among the components of device 700. For example, bus 705 may include a system bus, an address bus, a data bus, and/or a control bus. Bus 705 may also include bus drivers, bus arbiters, bus interfaces, clocks, and so forth.

Processor 710 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 710 may be implemented as hardware (e.g., a microprocessor, etc.), a combination of hardware and software (e.g., a SoC, an ASIC, etc.), may include one or multiple memories (e.g., cache, etc.), etc.

Processor 710 may control the overall operation, or a portion of operation(s) performed by device 700. Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, learning, model-based, etc.

Memory/storage 715 includes one or multiple memories and/or one or multiple other types of storage mediums. For example, memory/storage 715 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 715 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 715 may include drives for reading from and writing to the storage medium.

Memory/storage 715 may be external to and/or removable from device 700, such as, for example, a Universal Serial Bus (USB) memory stick, a dongle, a hard disk, mass storage, off-line storage, or some other type of storing medium. Memory/storage 715 may store data, software, and/or instructions related to the operation of device 700.

Software 720 includes an application or a program that provides a function and/or a process. As an example, with reference to service platform 170, software 720 may include an application that, when executed by processor 710, provides a function and/or a process of the smart conveyor belt web service platform, as described herein. Software 720 may also include firmware, middleware, microcode, hardware description language (HDL), and/or other form of instruction. Software 720 may also be virtualized. Software 720 may further include an operating system (OS) (e.g., Windows, Linux, Android, proprietary, etc.).

Communication interface 725 permits device 700 to communicate with other devices, networks, systems, and/or the like. Communication interface 725 includes one or multiple wireless interfaces and/or wired interfaces. For example, communication interface 725 may include one or multiple transmitters and receivers, or transceivers. Communication interface 725 may operate according to a protocol stack and a communication standard. Communication interface 725 may include an antenna. Communication interface 725 may include various processing logic or circuitry (e.g., multiplexing/de-multiplexing, filtering, amplifying, converting, error correction, application programming interface (API), etc.). Communication interface 725 may be implemented as a point-to-point interface, a service-based interface, or a reference interface, for example.

Input 730 permits an input into device 700. For example, input 730 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 735 permits an output from device 700. For example, output 735 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 700 may be implemented in the same manner. For example, device 700 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., data network 290) and/or another type of network (e.g., access network 220, core network 250, etc.). Thus, network devices described herein may be implemented as device 700.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 may cause processor 710 to perform a function or a process described herein. Alternatively, for example, according to other implementations, device 700 performs a function or a process described herein based on the execution of hardware (processor 710, etc.).

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 6, and message flows with respect to FIG. 3, the order of the blocks and message flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by network device, multiple orders, wherein each of the orders indicates one or more physical objects to be shipped;

generating, by network device, recipes for each of the multiple orders, wherein each of the recipes provides sorting instructions for a conveyor system;

transferring, by the network device, an identifier for a first recipe of the recipes to a queue of active recipes, wherein the queue is configured to hold a number of entries that is less than or equal to a number of sorting stations in the conveyor system;

sending, by the network device, the first recipe to a server device for the conveyor system;

receiving, by the network device, a recipe-complete status message indicating completion of the first recipe;

deleting, by the network device, the identifier for the first recipe from the queue based on receiving the recipe-complete status message;

transferring, by the network device, a second recipe of the recipes to the queue of active recipes, wherein the second recipe indicates one or more different physical objects than the first recipe; and sending, by the network device, the second recipe to the conveyor system.

2. The method of claim 1, further comprising:

adding, by the network device and prior to the transferring the identifier for the first recipe, each of the recipes to a queue of pending recipes, wherein the queue of pending recipes is configured to hold a number of entries that is greater than the number of sorting stations in the conveyor system.

3. The method of claim 1, further comprising:

sending, by the network device, an object list for the first recipe, wherein the object list identifies physical objects to be provided to the conveyor system; and sending, by the network device, another object list for the second recipe, wherein the other object list identifies different physical objects to be provided to the conveyor system.

4. The method of claim 1, further comprising:

initiating, by the network device, a communication session with the server device, wherein the server device executes a server application for the conveyor system.

5. The method of claim 1, wherein the identifier of each of the recipes is a unique identifier and each of the recipes include a list of objects for the order.

6. The method of claim 1, wherein the network device is included within a Multi-access Edge Computing (MEC) platform, and wherein the server device is included within a local area network (LAN) for the conveyer system.

7. The method of claim 1, further comprising:

receiving, by the network device, a bin-assigned status message associating the first recipe with a box identifier in the conveyor system, wherein the bin-assigned status message originates from the conveyor system after a first physical object for the first recipe has been scanned by the conveyor system.

8. The method of claim 7, further comprising:

updating, by the network device and based on the bin-assigned status message, the queue of active recipes to associate the box identifier with the recipe identifier.

9. The method of claim 1, wherein the recipe-complete status message originates from the conveyor system, wherein the recipe-complete status message further indicates removal of box from the sorting station.

10. The method of claim 1, further comprising:

sending, by the network device and to a warehouse management system, an inventory update message based on the recipe-complete status message.

11. A system comprising:

a network device including a processor configured to:

receive multiple orders, wherein each of the orders indicates one or more physical objects to be shipped;

generate recipes for each of the multiple orders, wherein each of the recipes provides sorting instructions for a conveyor system;

transfer an identifier for a first recipe of the recipes to a queue of active recipes, wherein the queue is configured to hold a number of entries that is less than or equal to a number of sorting stations in the conveyor system;

send the first recipe to a server device for the conveyor system;

receive a recipe-complete status message indicating completion of the first recipe;

delete the identifier for the first recipe from the queue based on receiving the recipe-complete status message;

transfer a second recipe of the recipes to the queue of active recipes, wherein the second recipe indicates one or more different physical objects than the first recipe; and send the second recipe to the conveyor system.

12. The system of claim 11, wherein the processor is further configured to:

add, prior to the transferring the identifier for the first recipe, each of the recipes to a queue of pending recipes, wherein the queue of pending recipes is configured to hold a number of entries that is greater than the number of sorting stations in the conveyor system.

13. The system of claim 11, wherein the processor is further configured to:

send an object list for the first recipe, wherein the object list identifies physical objects to be placed on the conveyor system, and send another object list for the second recipe, wherein the other object list identifies different physical objects to be placed on the conveyor system.

14. The system of claim 11, wherein the processor is further configured to:

initiate a communication session with the server device, wherein the server device executes a server application for the conveyor system.

15. The system of claim 11, wherein the identifier of each of the recipes is a unique identifier and each of the recipes include a list of objects for the order.

16. The system of claim 11, wherein the network device is included within a Multi-access Edge Computing (MEC) platform.

17. The system of claim 11, wherein the processor is further configured to:

receive a bin-assigned status message associating the first recipe with a box identifier in the conveyor system, wherein the bin-assigned status message originates from the conveyor system after a first physical object for the first recipe has been scanned by the conveyor system.

18. A non-transitory computer-readable medium containing instructions, executable by at least one processor of a network device, for:

receiving, by network device, multiple orders, wherein each of the orders indicates one or more physical objects to be shipped;

generating, by network device, recipes for each of the multiple orders, wherein each of the recipes provides sorting instructions for a conveyor system;

transferring, by the network device, an identifier for a first recipe of the recipes to a queue of active recipes, wherein the queue is configured to hold a number of entries that is less than or equal to a number of sorting stations in the conveyor system;

sending, by the network device, the first recipe to a server device for the conveyor system;

receiving, by the network device, a recipe-complete status message indicating completion of the first recipe;

deleting, by the network device, the identifier for the first recipe from the queue based on receiving the recipe-complete status message;

transferring, by the network device, a second recipe of the recipes to the queue of active recipes, wherein the second recipe indicates one or more different physical objects than the first recipe; and sending, by the network device, the second recipe to the conveyor system.

19. The non-transitory computer-readable medium of claim 18, further comprising instructions for:

receiving, by the network device, a bin-assigned status message associating the first recipe with a box identifier in the conveyor system, wherein the bin-assigned status message originates from the conveyor system after a first physical object for the first recipe has been scanned by the conveyor system.

20. The non-transitory computer-readable medium of claim 18, wherein the recipe-complete status message originates from the conveyor system in response to a polling message, and wherein the recipe-complete status message further indicates removal of box from the sorting station.

* * * * *